Feb. 23, 1937.  B. NICKLE  2,071,762

MAT

Filed Sept. 12, 1936

INVENTOR
Burr Nickle,
By Archworth Martin,
Attorney.

Patented Feb. 23, 1937

2,071,762

UNITED STATES PATENT OFFICE 2,071,762

MAT

Burr Nickle, Butler, Pa.

Application September 12, 1936, Serial No. 100,420

REISSUED

1 Claim. (Cl. 126—221)

My invention relates to mats and is hereinafter described as of a form more particularly suitable for use upon the tops of gas stove ovens.

The ovens of modern cooking stoves are commonly formed of sheet metal which is enameled, and although it is usual to line the ovens with thermal insulation material, the enameled metal frequently becomes heated to several hundred degrees, with the result that if a cool cooking vessel is set upon the top of the oven, there will be such thermal shock as to cause cracking of the enamel. Similarly, if the oven is cool, a hot vessel placed thereon may cause cracking.

While mats of various kinds can be placed on the oven to prevent direct contact therewith by vessels set upon the oven, they prevent radiation of the heat from the enameled surface, with the result that the enamel may crack or become discolored.

One object of my invention is to provide a mat of such form that it will prevent direct contact of cooking vessels or the like, with the oven tops, and will, nevertheless, provide for proper circulation or radiation of heated air from the oven top or from the bottom of a heated vessel placed thereon.

Figure 1:
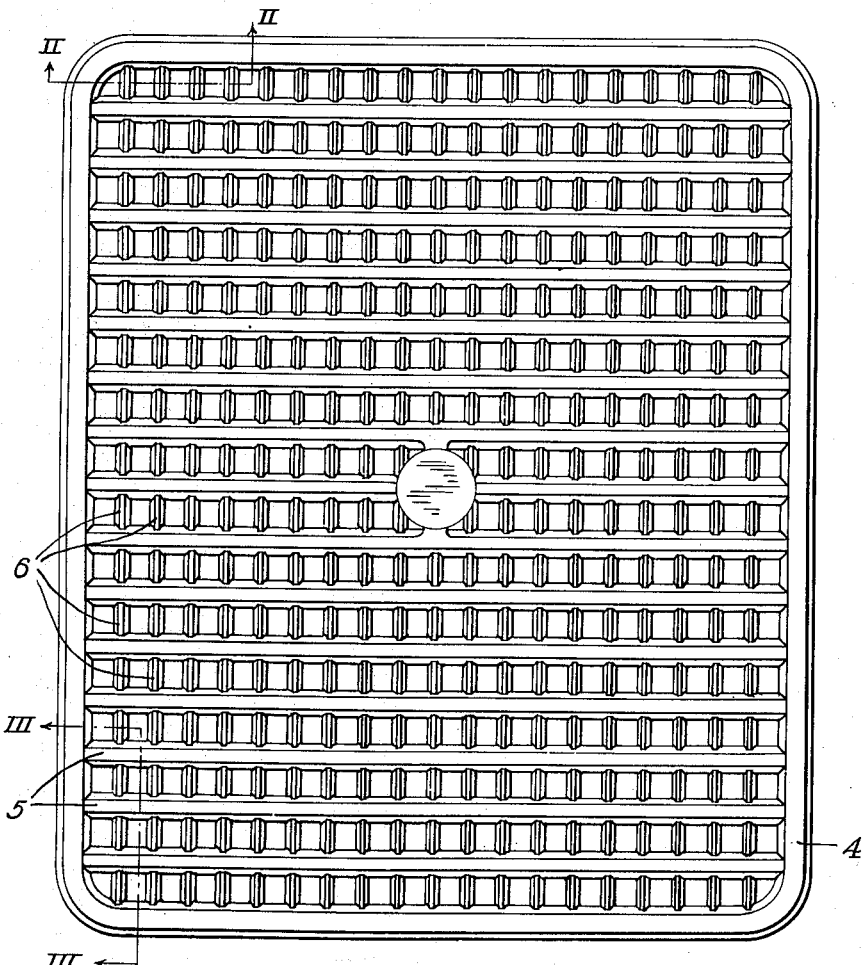
Figure 2:
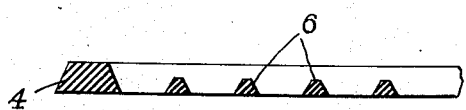
Figure 3:
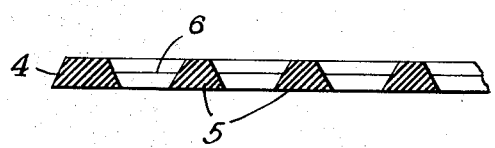

As shown in the accompanying drawing, Figure 1 is a plan view of my mat in its preferred form; Fig. 2 is a sectional view taken on the line II of Fig. 1; and Fig. 3 is a view taken on the line III of Fig. 1.

As shown in the drawing, the mat is formed of molded material such as rubber, of a type which will not be injuriously affected by heat of even several hundred degrees temperature. The mat is of integral structure and embodies a peripheral rib 4, with which ribs 5 merge at their ends. The cooking vessels or other articles, will be directly supported by the ribs 4 and 5.

Connecting the ribs 5, at their rear sides or bases, are series of cross-bars or ribs 6 which are formed integrally with the other ribs, but which are of low height relative to the ribs 4 and 5, and serve primarily as tie elements for holding the large ribs properly in place. This arrangement of small ribs and large ribs constitutes an important feature of my invention, since there is ample clearance between the ribs 6 and the bottom of a pot which is placed on the mat, with the result that there will be no entrapped pockets of heated air, because air can radiate and circulate freely between the bottom of a vessel and the upper side of the ribs 6. The surface of the oven will therefore be of more uniform temperature throughout its area than if the ribs 6 were of the same height as the ribs 5, or if an unperforated mat were employed.

It is further to be noted that by reason of the mesh-like or perforated form of the mat, with provision for circulation of air horizontally, the mat will not become so heated as to cause discoloration of the enameled oven surface, even though the mat be formed of sulphur-vulcanized rubber.

Other advantages of employing the small connecting ribs are that the mat is quite flexible along lines parallel to the heavy ribs 5, so that there will be less tendency for it to warp out of shape, it will lie much more snugly in contact with either flat or curved surfaces, and it can be rolled more readily.

The mat will, of course, be useful at places other than upon an oven. For example, it can be used to support a cooking vessel after the vessel has been removed from the stove, and in such case, the circulation of air across the entire bottom of the vessel will tend to cause more uniform and quicker cooling of the food which is in the vessel, instead of the mid-portion of the vessel remaining at a high temperature for a considerable time after the sides of the vessel have cooled. It has been found that the flavor and texture of a cooked food which has been cooled somewhat uniformly, is in many cases superior to food which has been cooled gradually from the sides and wherein the cooling of the mid-portion of the food takes place long afterward.

I claim as my invention:

A mat having article-supporting ribs disposed in laterally spaced relation, and laterally spaced ribs extending transversely of and connecting the first-named ribs, certain of the rib elements being of smaller perpendicular dimension than the other ribs, to permit of circulation of air in a plane intermediate the uppermost and lowermost planes of the mat.

BURR NICKLE.